United States Patent
Liu et al.

(10) Patent No.: US 7,283,327 B1
(45) Date of Patent: Oct. 16, 2007

(54) MAGNETIC WRITE HEAD HAVING RESISTIVE HEATER COIL

(75) Inventors: Francis H. Liu, Fremont, CA (US); Kroum S. Stoev, Pleasanton, CA (US); Mohamad T. Krounbi, San Jose, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 0 days.

(21) Appl. No.: 11/451,770

(22) Filed: Jun. 13, 2006

Related U.S. Application Data

(63) Continuation of application No. 10/856,403, filed on May 28, 2004, now Pat. No. 7,092,195.

(51) Int. Cl.
- G11B 5/17 (2006.01)
- G11B 5/56 (2006.01)
- G11B 21/02 (2006.01)

(52) U.S. Cl. ............... 360/123; 360/128; 360/294.7; 360/75

(58) Field of Classification Search ............. None
See application file for complete search history.

(56) References Cited

U.S. PATENT DOCUMENTS

| | | |
|---|---|---|
| 5,021,906 A | 6/1991 | Chang et al. |
| 5,712,463 A | 1/1998 | Singh et al. |
| 5,943,189 A | 8/1999 | Boutaghou et al. |
| 5,991,113 A | 11/1999 | Mayer et al. |
| 6,111,724 A | 8/2000 | Santini |
| 6,344,949 B1 | 2/2002 | Albrecht et al. |
| 6,359,746 B1 | 3/2002 | Kakekado et al. |

(Continued)

FOREIGN PATENT DOCUMENTS

| JP | 03154240 A | 7/1991 |
|---|---|---|

(Continued)

OTHER PUBLICATIONS

Institute of Electrical and Electronic Engineers, Inc. The IEEE Standard Disctionary of Electrical and Electronics Terms, sixth edition, IEEE Std 100-1996.*

(Continued)

*Primary Examiner*—Andrew L. Sniezek
(74) *Attorney, Agent, or Firm*—Knobbe, Martens, Olson & Bear

(57) ABSTRACT

A magnetic write head includes a magnetic yoke having a first pole and a second pole. The first pole and the second pole each terminate at an air bearing surface. The first pole is magnetically coupled to the second pole in a backgap region. The magnetic write head further includes a electrically conductive write coil magnetically coupled to the magnetic yoke. The magnetic write head further includes a resistive heater coil having a first coil turn and a second coil turn. The heater coil is electrically isolated from the write coil. At least a portion of the first coil turn is between the first pole and the second pole and between the air bearing surface and the backgap region. At least a portion of the second coil turn is between the first pole and the second pole and between the air bearing surface and the backgap region. The portion of the first coil turn overlaps the portion of the second coil turn.

10 Claims, 8 Drawing Sheets

U.S. PATENT DOCUMENTS

| | | |
|---|---|---|
| 6,493,183 B1 | 12/2002 | Kasiraj et al. |
| 6,501,606 B2 | 12/2002 | Boutaghou et al. |
| 6,504,676 B1 | 1/2003 | Hiner et al. |
| 6,529,342 B1 | 3/2003 | Feng et al. |
| 6,570,730 B1 | 5/2003 | Lewis et al. |
| 6,577,466 B2 | 6/2003 | Meyer et al. |
| 6,597,539 B1 | 7/2003 | Stupp et al. |
| 6,707,646 B2 | 3/2004 | Berger et al. |
| 6,775,103 B2 | 8/2004 | Kang et al. |
| 6,791,793 B1 | 9/2004 | Chen et al. |
| 6,813,115 B2 | 11/2004 | Van der Heijden et al. |
| 6,816,339 B1 | 11/2004 | Litvinov et al. |
| 6,822,829 B2 | 11/2004 | Minor et al. |
| 6,834,026 B2 | 12/2004 | Fullerton et al. |
| 6,847,509 B2 | 1/2005 | Yoshikawa et al. |
| 6,920,020 B2 | 7/2005 | Yamanaka et al. |
| 6,922,311 B2 | 7/2005 | Kobayashi |
| 6,934,113 B1 | 8/2005 | Chen |
| 6,992,865 B2 | 1/2006 | Thurn et al. |
| 7,092,195 B1 | 8/2006 | Liu et al. |
| 7,154,696 B2 | 12/2006 | Nikitin et al. |
| 2002/0024774 A1 | 2/2002 | Berger et al. |
| 2003/0011932 A1 | 1/2003 | Mei et al. |
| 2003/0099054 A1 | 5/2003 | Kamijima |
| 2004/0075940 A1 | 4/2004 | Bajorek et al. |
| 2004/0130820 A1 | 7/2004 | Ota |
| 2004/0165305 A1 | 8/2004 | Nishiyama |
| 2004/0184192 A1 | 9/2004 | Ota et al. |
| 2004/0218302 A1 | 11/2004 | Maat |
| 2004/0240109 A1 | 12/2004 | Hamann et al. |
| 2005/0013034 A1 | 1/2005 | Margulies et al. |
| 2005/0018347 A1 | 1/2005 | Hsiao et al. |
| 2005/0024775 A1 | 2/2005 | Kurita et al. |
| 2005/0088784 A1 | 4/2005 | Macken et al. |
| 2005/0117242 A1* | 6/2005 | Taguchi ...................... 360/59 |
| 2005/0243473 A1 | 11/2005 | Hu et al. |
| 2006/0034013 A1 | 2/2006 | Kato et al. |

FOREIGN PATENT DOCUMENTS

| | | | |
|---|---|---|---|
| JP | 5-20635 | * | 1/1993 |
| JP | 05151734 A | | 6/1993 |

OTHER PUBLICATIONS

Gordon J. Smith, "Dynamic In-Situ Measurements of Head-to-Disk Spacing", IEEE Transactions on Magnetics, vol. 35, No. 5, Sep. 1999, pp. 2346-2351.

Vladimir Nikitin, et al., "Spatial and Temporal Profiling of Protrusion in Magnetic Recording Heads", IEEE Transactions on Magnetics, vol. 40, No. 1, Jan. 2004, pp. 326-331.

Machtle, P., et al., "Integrated Microheaters for In-Situ Flying Height Control of Sliders Used in Hard-Disk Drives", The 14th IEEE International Conference on Micro Electro Mechanical Systems, Meeting Date: Jan. 21, 2001-Jan. 25, 2001, MEMS 2001, pp. 196-199.

R.M. Costescu, et al., "Ultra-Low Thermal Conductivity in W/Al2O3 Nanolaminates", Science, vol. 303, Issue 5660, pp. 989-990, Feb. 13, 2004.

* cited by examiner

MAGNETIC WRITE HEAD HAVING RESISTIVE HEATER COIL

RELATED APPLICATIONS

This application is a continuation of U.S. patent application Ser. No. 10/856,403, filed May 28, 2004, now U.S. Pat. No. 7,092,195 which is incorporated in its entirety by reference herein.

BACKGROUND OF THE INVENTION

1. Field of the Invention

This application relates generally to magnetic write heads for magnetic recording, and more specifically to apparatuses and methods for controlling the flying-height distance between the write head and the magnetic medium.

2. Description of the Related Art

The areal density of magnetic recording depends in part on the flying-height distance between the magnetic medium and the air-bearing surface ("ABS") of the magnetic write head. As areal densities continue to increase, the flying-height distance continues to decrease. In addition, the flying-height distances among different write heads .have variations (e.g., due to variations in the manufacturing process). The ranges of these variations have remained substantially the same as flying-height distances have decreased, such that these variations correspond to larger percentages of the flying-height distance.

In addition, the flying-height distance of a particular write head can vary during operation. For example, a standard magnetic write head heats up to different temperatures as the write head is driven at different frequencies. This heat can cause at least a portion of the write head to expand (via the coefficient of thermal expansion) such that at least a portion of the write head protrudes towards the magnetic medium, thereby reducing the flying-height distance. Occasionally, the write head can contact the magnetic medium due to this thermally-reduced flying-height distance. The resulting impact can cause the write head to drift off-track, thereby causing a delay in the time for data access. While such impacts can be avoided by increasing the flying-height distance, larger flying-height distances negatively affect the performance of the write head and reduce the areal density that can be achieved.

SUMMARY OF THE INVENTION

A magnetic write head comprises a magnetic yoke comprising a first pole and a second pole. The first pole and the second pole each terminate at an air bearing surface. The first pole is magnetically coupled to the second pole in a backgap region. The magnetic write head further comprises a electrically conductive write coil magnetically coupled to the magnetic yoke. The magnetic write head further comprises a resistive heater coil comprising a first coil turn and a second coil turn. The heater coil is electrically isolated from the write coil. At least a portion of the first coil turn is between the first pole and the second pole and between the air bearing surface and the backgap region. At least a portion of the second coil turn is between the first pole and the second pole and between the air bearing surface and the backgap region. In certain embodiments, the portion of the first coil turn overlaps the portion of the second coil turn.

In certain embodiments, the first coil turn and the second coil turn are each substantially planar and are non-coplanar with one another.

A magnetic write head comprises a magnetic yoke having an air bearing surface configured to be separated from a magnetic medium by a flying-height distance dependent on temperature. The magnetic write head further comprises a electrically conductive write coil magnetically coupled to the magnetic yoke. The magnetic write head further comprises a resistive heater electrically isolated from the write coil. In certain embodiments, the resistive heater comprises a substantially planar first conductor segment in proximity to the air bearing surface and a substantially planar second conductor segment in proximity to the air bearing surface and the first conductor segment is non-coplanar with the second conductor segment.

DETAILED DESCRIPTION

Figure 1:
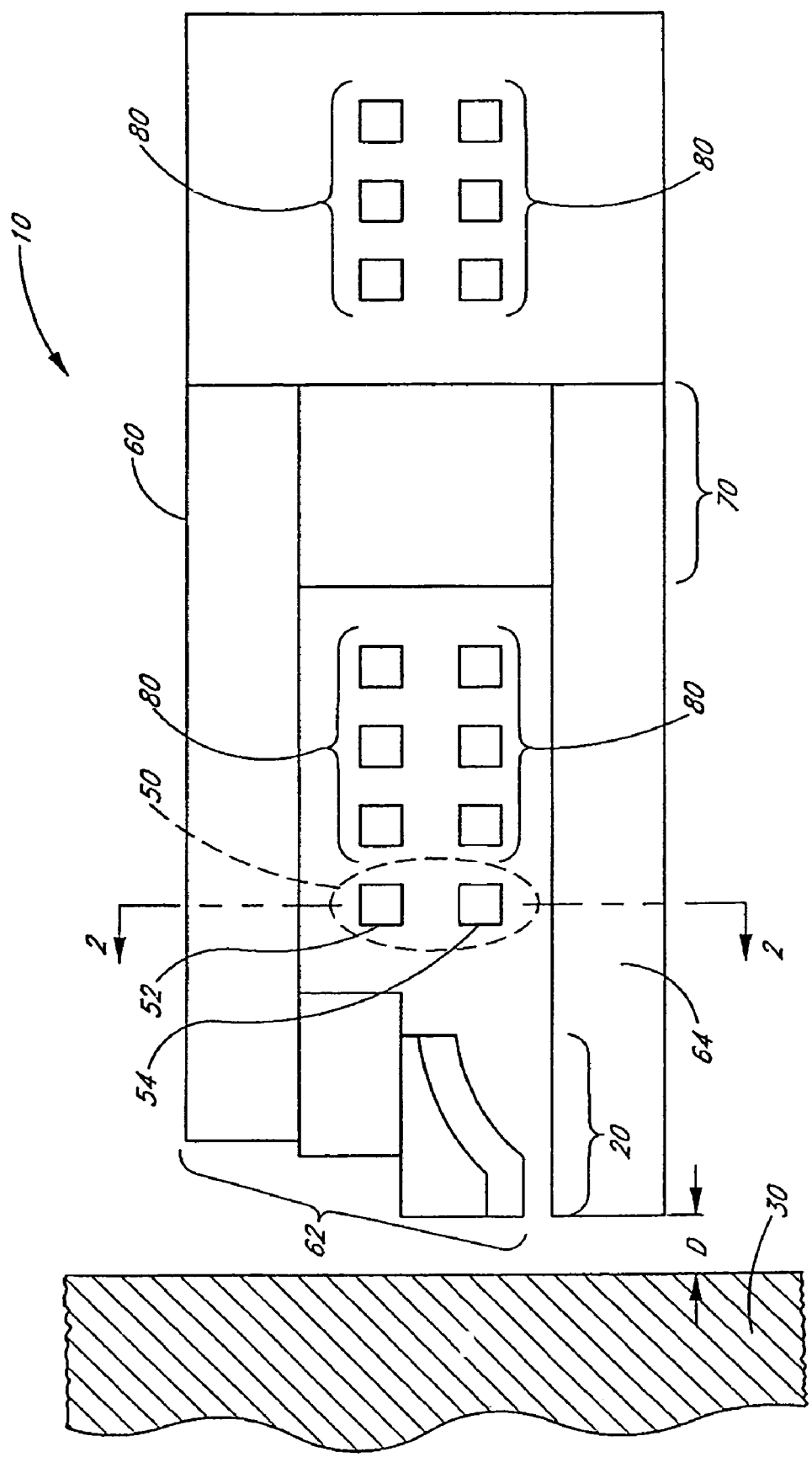
FIG. 1 schematically illustrates a cross-sectional view of an exemplary magnetic write head in accordance with embodiments described herein.

FIG. 1 schematically illustrates a cross-sectional view of an exemplary magnetic write head 10 in accordance with embodiments described herein. The write head 10 comprises a gap region 20 configured to generate a magnetic field at a magnetic medium 30. The gap region 20 and the magnetic medium 30 are separated by a flying-height distance D that depends on a temperature of the gap region 20. The write head 10 further comprises a resistive heater 50 comprising a first conductor segment 52 located in a first position in proximity to the gap region 20. The first conductor segment 52 has a first electrical resistance and is configured to allow a first electric current to flow therethrough. The first electric current generates heat in the gap region 20 and generates a first magnetic field. The resistive heater 50 further comprises a second conductor segment 54 located in a second position in proximity to the gap region 20. The second conductor segment 54 has a second electrical resistance and is configured to allow a second electric current to flow therethrough. The second electric current generates heat in the gap region 20 and generates a second magnetic field. The second position and the second electric current are selected with respect to the first position and the first electric current such that a superposition of the first magnetic field and the second magnetic field has a negligible magnitude at the magnetic medium 30.

In certain embodiments, as schematically illustrated by FIG. 1, the write head 10 comprises a magnetic yoke 60 comprising a first pole 62 and a second pole 64. Each of the first pole 62 and the second pole 64 comprises a magnetically-soft material. The first pole 62 is spaced from the second pole 64 in the gap region 20, which is configured to be positioned in proximity to the magnetic medium 30. The first pole 62 is magnetically coupled to the second pole 64 in a backgap region 70. While the write head 10 of FIG. 1 comprises a stitched-pole configuration, other configurations of the write head 10, including single-pole-type write heads, are compatible with embodiments described herein. In addition, embodiments described herein can be utilized with longitudinal-recording write heads or perpendicular-recording write heads.

In certain embodiments, the write head 10 further comprises an electrically conductive write coil 80 magnetically coupled to the magnetic yoke 60. A portion of the write coil 80 is positioned between the first pole 62 and the second pole 64 and between the gap region 20 and the backgap region 70, as schematically illustrated by FIG. 1. During a write operation, an electric current flowing through the write coil 80 generates magnetic flux in the magnetic yoke 60. The magnetic flux flows through the magnetic yoke 60 to the gap region 20. Since the first pole 62 and the second pole 64 are spaced apart in the gap region 20, a magnetic field is generated by the gap region 20 in a portion of the magnetic medium 30 in proximity to the gap between the first pole 62 and the second pole 64. The magnetic field at the magnetic medium 30 is dependent on the materials and physical configuration of the first pole 62, the second pole 64, and the other components of the write head 10. The materials and configurations of the various components of the write head 10 are selected to generate a sufficiently strong and localized magnetic field for writing data onto selected portions of the magnetic medium 30. An exemplary configuration of a write head 10 compatible with embodiments described herein is described in U.S. patent application Ser. No. 09/978,435, filed Oct. 16, 2001, entitled "Transducers For Perpendicular Recording With Inductive Cancellation At MR Sensor," which is incorporated in its entirety by reference herein. Other materials and configurations of the write coil 80, the magnetic yoke 60, including the first pole 62 and the second pole 64, and the gap region 20 are also compatible with embodiments described herein.

The first conductor segment 52 and the second conductor segment 54 of the resistive heater 50 each generate heat upon flowing an electric current therethrough. In certain embodiments, the first conductor segment 52 and the second conductor segment 54 of the resistive heater 50 are positioned in proximity to the gap region 20 to provide resistive heating power to the gap region 20. In certain embodiments, as schematically illustrated by FIG. 1, the first conductor segment 52 and the second conductor segment 54 are positioned within the magnetic yoke 60. In other embodiments, the first conductor segment 52 and the second conductor segment 54 are positioned elsewhere in the write head 10 but still in sufficient proximity to the gap region 20 to heat the gap region 20.

In certain embodiments, the write head 10 is a component of a read head/write head structure having a read head (not shown). The first and second conductor segments 52, 54 of certain such embodiments are located in proximity to the gap region 20 to provide sufficiently high efficiency for producing thermally-induced protrusion of at least a portion of the gap region 20 with minimal heating of the read head. In addition, for hard disk drives comprising a plurality of disks and a plurality of write heads 10, certain embodiments described herein allow the flying-height distances D between each disk and its corresponding write head 10 to be controlled independent of one another.

In certain embodiments, each of the first conductor segment 52 and the second conductor segment 54 comprises an electrically conductive material. Exemplary electrically conductive materials include, but are not limited to, copper, nickel, iron, molybdenum, tungsten, aluminum, silver, platinum, gold, zinc, steel alloy (e.g., 99.5% iron, 0.5% carbon), nickel-iron alloy, nickel-chromium alloy, nichrome alloy, nichrome V alloy, manganin alloy, and constantan alloy.

In certain embodiments, the electrical resistance of the first conductor segment 52 and the second electrical resistance of the second conductor segment 54 are each in a range between approximately 1 ohm and approximately 200 ohms, and in certain other embodiments, the first and second electrical resistances are each approximately equal to 1.5 ohms.

In certain embodiments, each of the first electric current and the second electric current is in a range between zero and approximately 100 milliamps. In still other embodiments, the first electric current and the second electric current are selected with corresponding voltages such that the range of heating power generated by the resistive heater 50 is in a range between zero and approximately 300 milliwatts. In certain embodiments, the first and second electric currents are direct current (DC), while in other embodiments, the first and second electric currents are alternating current (AC). The materials and the dimensions (e.g., length, cross-sectional area) of the first conductor segment 52 and the second conductor segment 54, as well as the first electric current and the second electric current, are selected in certain embodiments to provide sufficient resistive heating power to the gap region 20.

Besides creating heat, the first electric current and the second electric current generate a first magnetic field and a second magnetic field, respectively. Because the gap region 20 is close to the magnetic medium 30, placement of the first conductor segment 52 and the second conductor segment 54 in proximity to the gap region 20 in certain embodiments results in the first conductor segment 52 and the second conductor segment 54 also being in proximity to the magnetic medium 30. Each of the first magnetic field and the second magnetic field can have a sufficient magnitude to adversely affect the magnetization of portions of the magnetic medium 30. Certain embodiments described herein advantageously position the first conductor segment 52 and the second conductor segment 54 and advantageously select the first electric current and the second electric current to prevent the first and second magnetic fields generated by the first and second conductor segments 52, 54 from influencing the magnetic medium 30. In certain embodiments, the superposition of the first magnetic field and the second magnetic field has a negligible magnitude at the magnetic medium 30.

Figure 2:
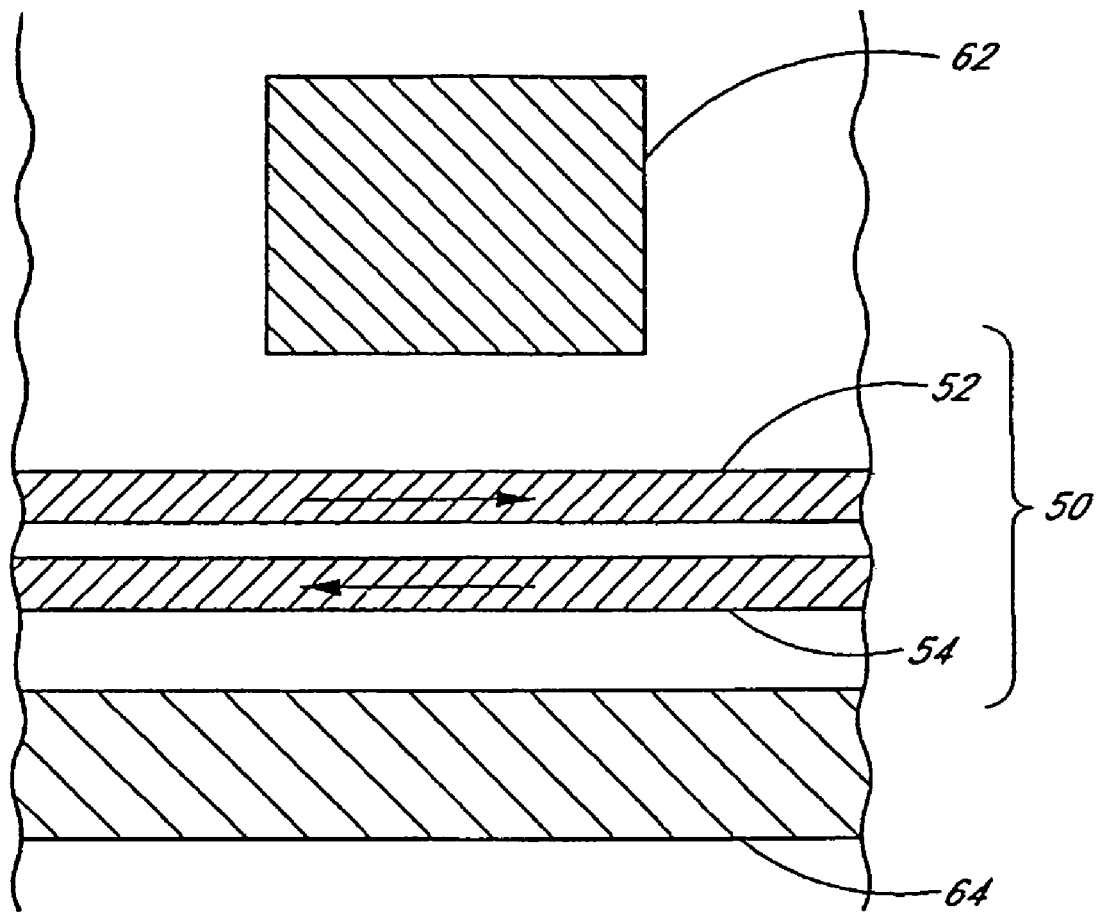
FIG. 2 schematically illustrates a cross-sectional view of a portion of an exemplary resistive heater in accordance with embodiments described herein.

FIG. 2 schematically illustrates a cross-sectional view of a portion of an exemplary resistive heater 50 in accordance with embodiments described herein. The resistive heater 50 of FIG. 2 has both the first conductor segment 52 and the second conductor segment 54 positioned between the first pole 62 and the second pole 64. The first conductor segment 52 and the second conductor segment 54 are substantially parallel to one another. In certain such embodiments, the first electric current has a first magnitude and flows in a first direction (shown by a first arrow in FIG. 2) along the first conductor segment 52. The second electric current of certain embodiments has a second magnitude and flows in a second direction (shown by a second arrow in FIG. 2) along the second conductor segment 54. In certain embodiments, the second magnitude is substantially equal to the first magnitude, and the second direction is substantially opposite to the first direction. The embodiment schematically illustrated by FIG. 2 has a substantially straight first conductor segment 52 and a substantially straight second conductor segment 54. Other embodiments utilize first and second conductor segments 52, 54 that are curved or that have curved sections and straight sections.

In certain embodiments, the resistive heater 50 comprises an electrically conductive heating coil 90 having a plurality of coil turns. The heating coil 90 of certain embodiments comprises a first coil turn 92 that includes the first conductor segment 52. The heating coil 90 of certain embodiments further comprises a second coil turn 94 that includes the second conductor segment 94. The heating coil 90 of certain such embodiments comprises an even number of coil turns (e.g., 2, 4, 6, 8, . . . ). Since the resistive heating power is proportional to the number of coil turns, more coil turns provide more heat, thereby providing larger actuation. In certain embodiments, the heating coil 90 is formed by the standard deposition processes used to form the write coil 80.

In an exemplary embodiment, the heating coil 90 comprises four coil turns each having a resistance of approximately 1.5 ohms. Resistive heating power generated by an electric current flowing through the heating coil 90 is given by the relation: $P=nI^2R$, where n is the number of coil turns, I is the current and R is the resistance of the conductor. By flowing an electric current of approximately 60 milliamps through the heating coil 90, a resistive heating power of approximately 216 milliwatts is generated. This amount of resistive heating power can yield a controlled activation of up to approximately 8 nanometers. In certain embodiments, such a magnitude of activation is sufficient to control the flying-height distance D.

Figure 3:
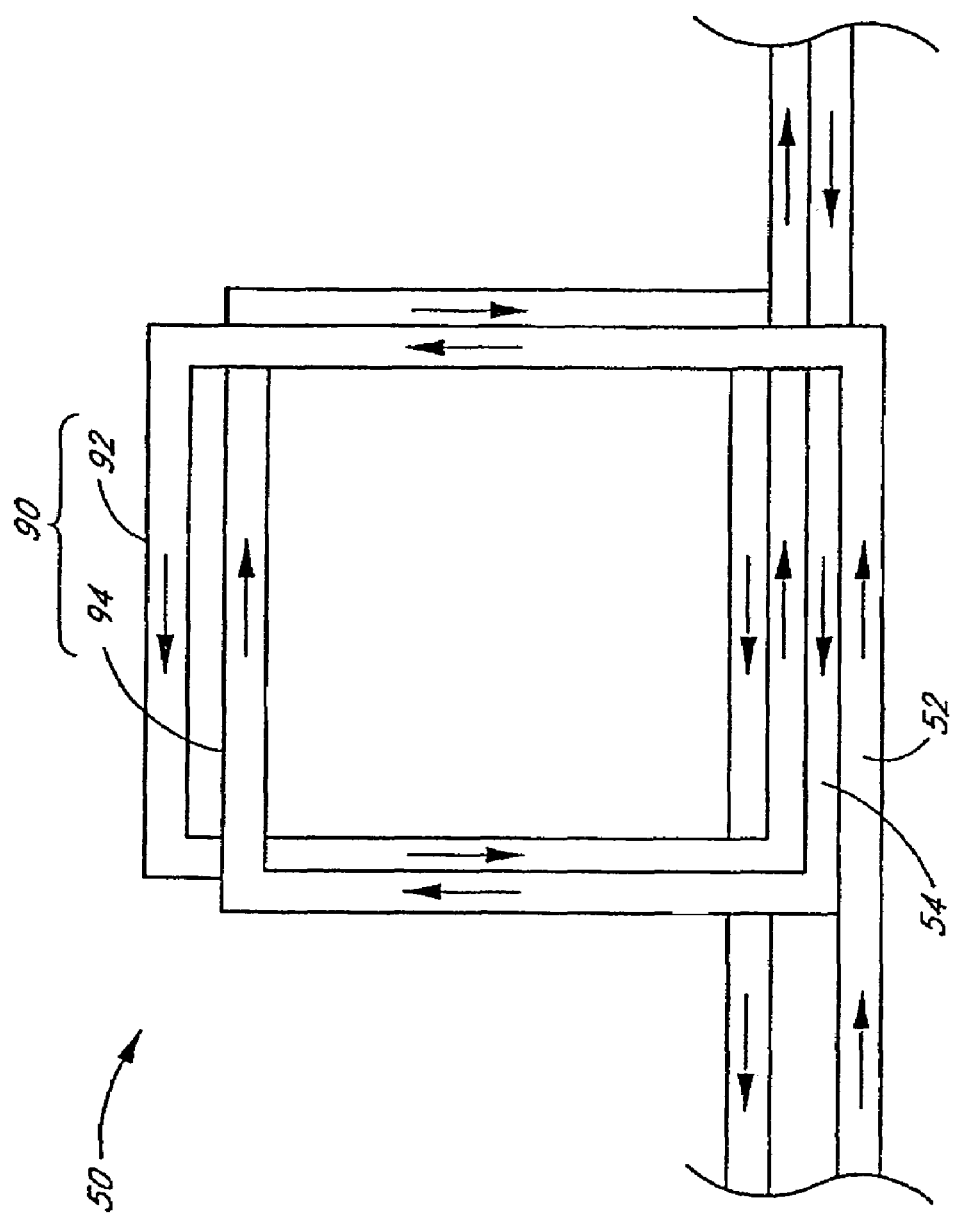
FIG. 3 schematically illustrates a perspective view of a portion of an exemplary resistive heater in accordance with embodiments described herein.

FIG. 3 schematically illustrates a perspective view of a portion of an exemplary resistive heater 50 in accordance with embodiments described herein. The first coil turn 92 and the second coil turn 94 of FIG. 3 are substantially parallel to one another. In addition, the first electric current flowing through the first coil turn 92 and the second electric current flowing through the second coil turn 94 flow in substantially opposite directions with substantially equal magnitudes. In such embodiments, the first magnetic field produced by the first coil turn 92 is effectively cancelled by the second magnetic field produced by the second coil turn 94. The heat produced by the first and second coil turns 92, 94 adjusts the flying-height distance D by modifying the temperature of the gap region 20. In such embodiments, the performance of the write head 10 is substantially unaffected by stray magnetic fields from the heating coil 90.

The first coil turn 92 and the second coil turn 94 of FIG. 3 are generally rectangular in shape and have generally straight sections. The conductors that form the first and second coil turns 92, 94 have generally square cross-sectional areas. Other heating coils 90 having first and second coil turns 92, 94 with other shapes and sections, and comprising conductors having other cross-sectional areas are compatible with embodiments described herein. In certain embodiments, the cross-sectional areas of the conductors of the first and second coil turns 92, 94 are selected to provide desired resistances for the first conductor segment 52 and the second conductor segment 54.

In certain embodiments, at least a portion of the first coil turn 92 and at least a portion of the second coil turn 94 are in proximity to the gap region 20 of the magnetic yoke 60. By placing the first and second coil turns 92, 94 in proximity to the gap region 20, certain embodiments achieve a high efficiency for protrusion of the gap region 20, whereby only minimal heating is utilized. Such embodiments are in contrast to existing systems which utilize a resistive heater elsewhere on the air-bearing slider of the hard disk drive (e.g., U.S. Pat. No. 5,991,113, which is incorporated in its entirety by reference herein) or on a suspension arm of the hard disk drive (e.g., U.S. Patent Application Publication No. 2002/0024774A1, which is incorporated in its entirety by reference herein).

Figure 4A:
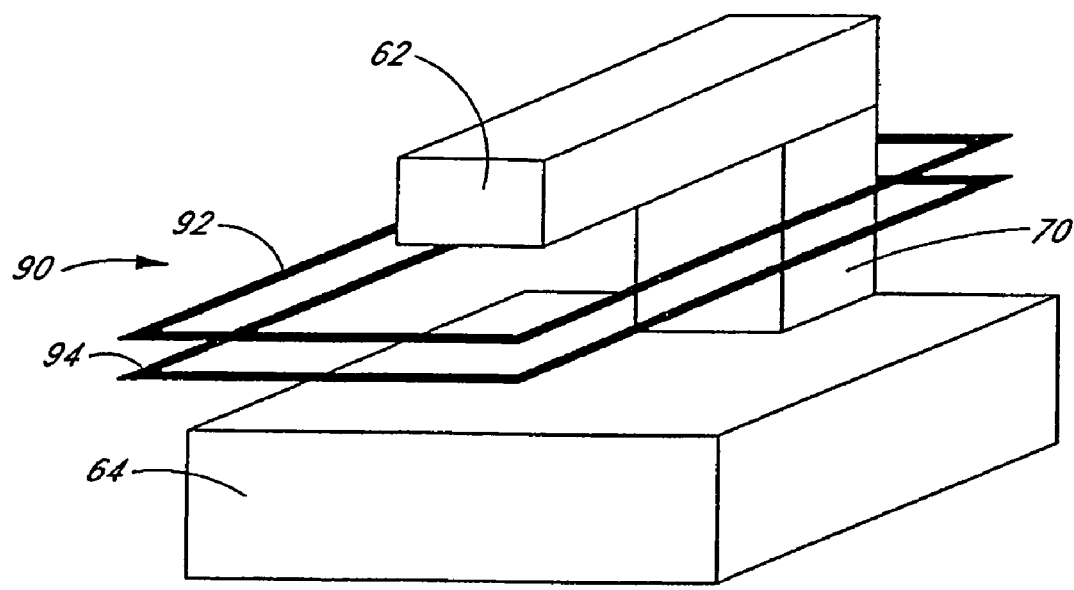
FIGS. 4A-4B schematically illustrate two exemplary configurations of a heating coil oriented generally perpendicularly to the magnetic medium in accordance with embodiments described herein.
Figure 4B:
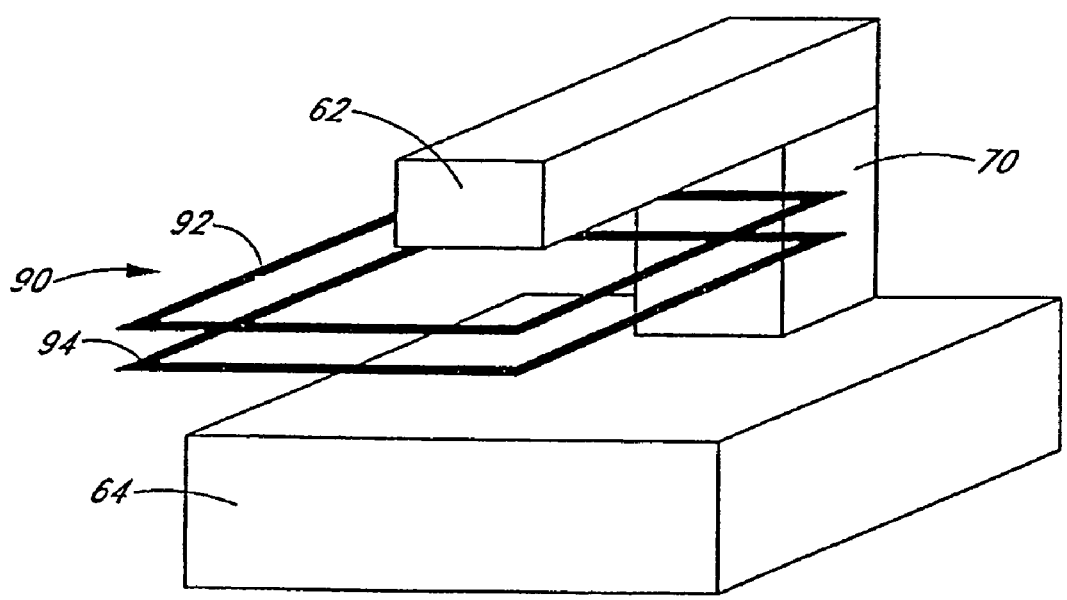

FIGS. 4A-4B schematically illustrate two exemplary configurations in which the heating coil 90 is positioned between the first pole 62 and the second pole 64 and is oriented generally perpendicularly to the magnetic medium 30 and generally parallel to the first pole 62. In FIG. 4A, the first coil turn 92 and the second coil turn 94 each substantially encircle the backgap region 70. In FIG. 4B, the first coil turn 92 and the second coil turn 94 are each substantially within the magnetic yoke 60 in a region defined by the first pole 62, the second pole 64, the gap region 20, and the backgap region 70.

Figure 4C:
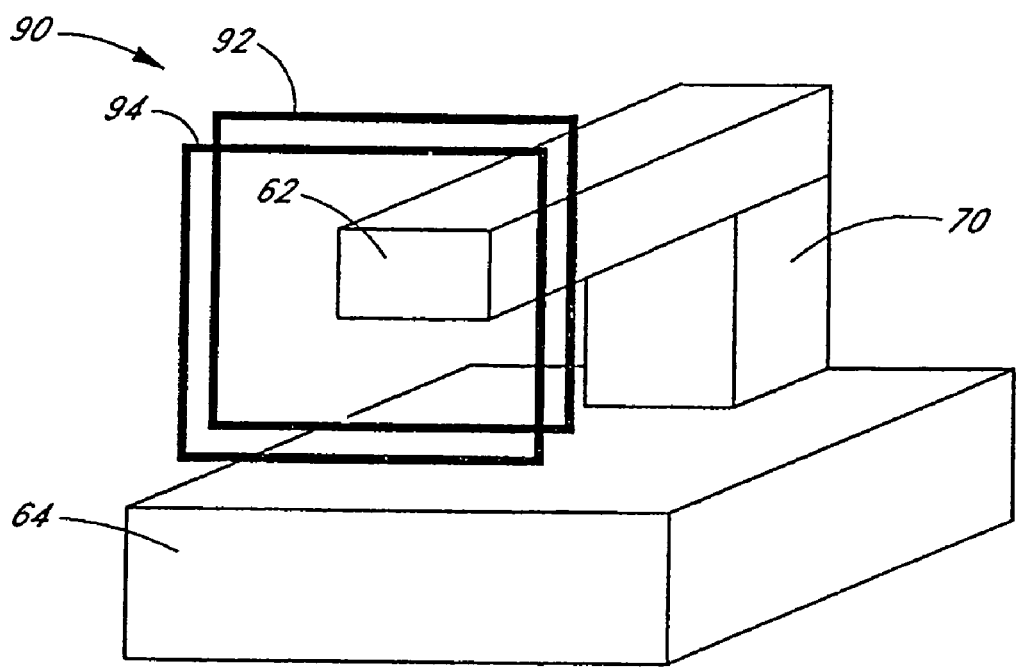
FIGS. 4C-4D schematically illustrate two exemplary configurations of a heater coil oriented generally parallel to the magnetic medium in accordance with embodiments described herein.
Figure 4D:
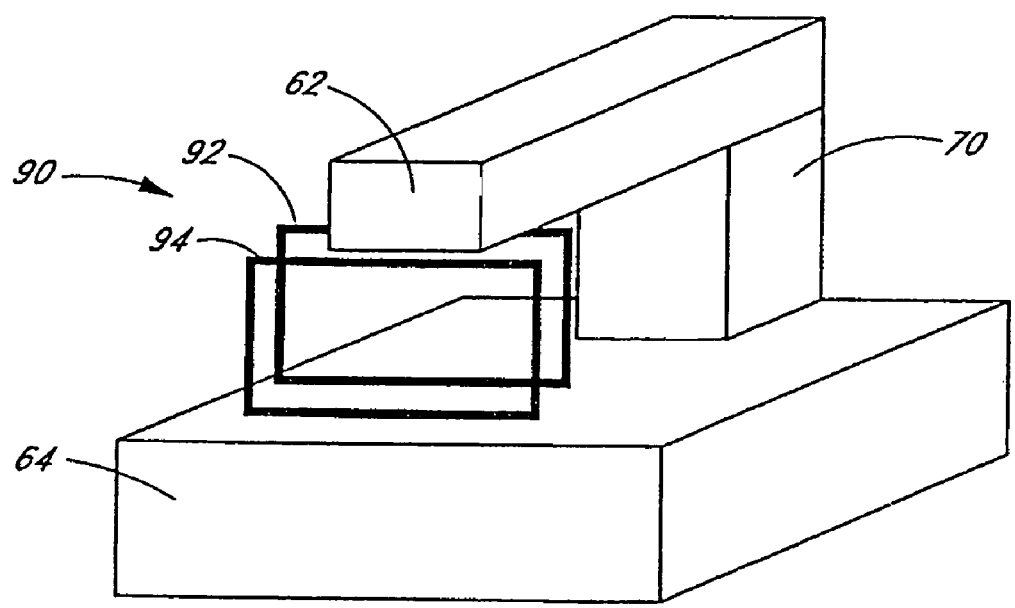

FIGS. 4C-4D schematically illustrate two exemplary configurations in which the heater coil 90 is generally planar and is oriented generally parallel to the magnetic medium 30 and generally perpendicularly to the first pole 62. In FIG. 4C, the first coil turn 92 and the second coil turn 94 each substantially encircle the first pole 62. In FIG. 4D, the first coil turn 92 and the second coil turn 94 are each substantially within the magnetic yoke 60 in a region defined by the first pole 62, the second pole 64, the gap region 20, and the backgap region 70.

Other configurations of the heating coil 90 with respect to the magnetic yoke 60 in addition to those schematically illustrated by FIGS. 4A-4D are compatible with embodiments described herein.

Figure 5:
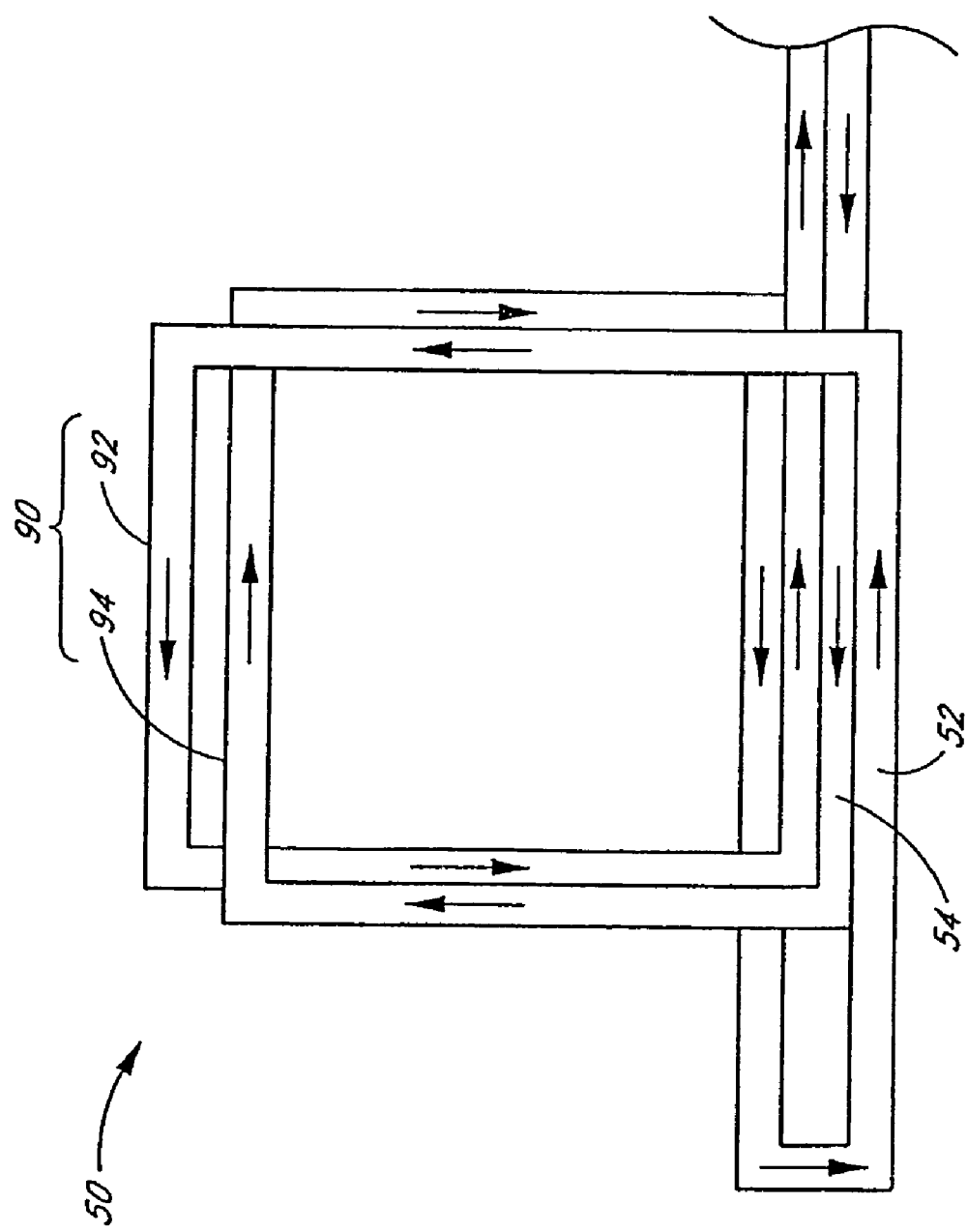
FIG. 5 schematically illustrates a heating coil having a first coil turn and a second coil turn which are generally parallel to one another and are electrically coupled in series.

In certain embodiments, the first coil turn 92 and the second coil turn 94 are electrically coupled in series, as schematically illustrated by FIG. 5. In such embodiments, the first electrical current and the second electrical current have substantially equal magnitudes. In addition, such embodiments advantageously utilize a single current source electrically coupled to the heating coil 90.

In certain embodiments, the heat generated by the first electric current flowing through the first conductor segment 52 and the heat generated by the second electric current flowing through the second conductor segment 54 are controlled to maintain the temperature of the gap region 20 to be substantially constant. In certain other embodiments, the first electric current and the second electric current are selected to maintain the flying-height distance D to be substantially constant.

In certain embodiments, the heating coil 90 is electrically insulated from the write coil 80. In such embodiments, the electric current flowing through the heating coil 90 is independent from the electric current flowing through the write coil 80 to create the magnetic flux. In such embodiments, the dissipated heat in the resistive heater 50 is controllable independent of the operating electric current of the write head 10. Thus, in certain embodiments, the flying-height distance D can be controlled independent of the write operations of the write head 10. In certain embodiments in which the electric current flowing through the write coil 80 heats the gap region 20, the activation of the resistive heater 50 and the activation of the write coil 80 are coordinated to control the flying-height distance D. For example, when the write coil 80 is activated, the current through the resistive heater 50 is reduced to maintain a substantially constant temperature.

Figure 6:
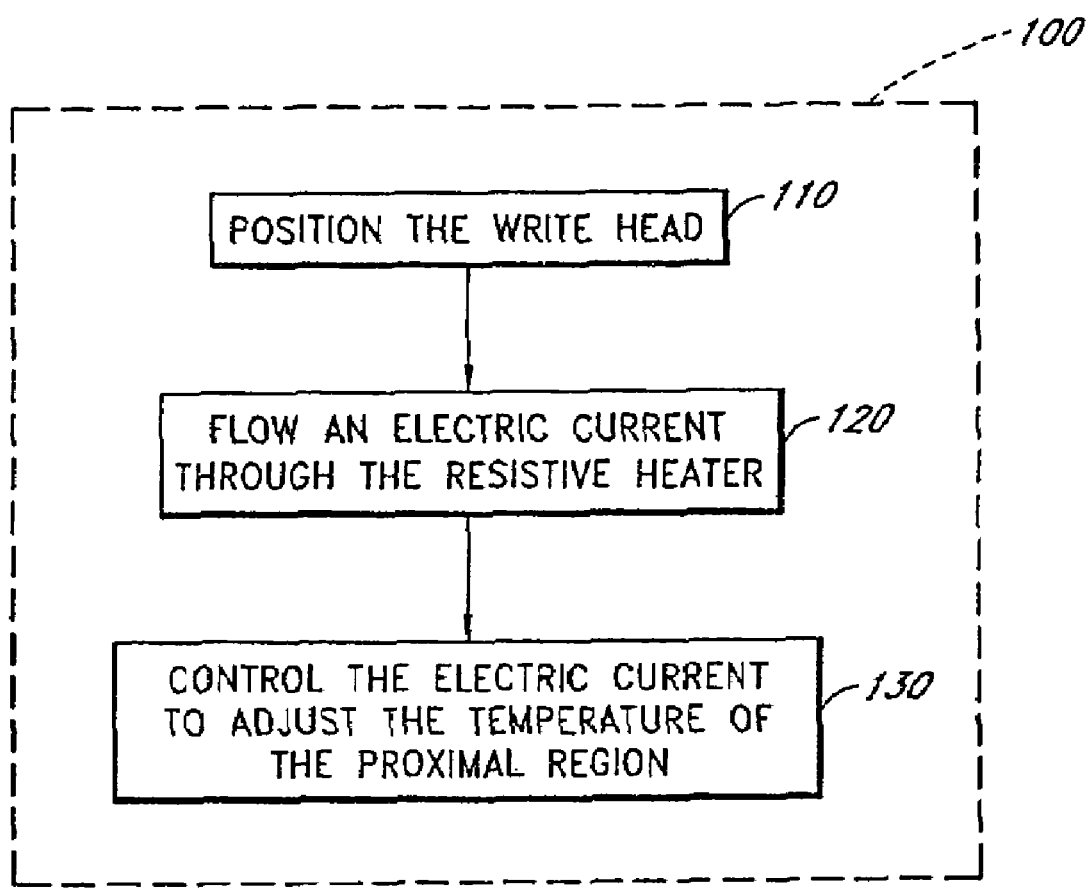
FIG. 6 is a flowchart of an exemplary method of adjusting a flying-height distance between a magnetic write head and a magnetic medium in accordance with embodiments described herein.

FIG. 6 is a flowchart of an exemplary method 100 of adjusting a flying-height distance D between a magnetic write head 10 and a magnetic medium 30 in accordance with embodiments described herein. Although the discussion below refers to the structure of the write head 10 schematically illustrated by FIGS. 1-5, the method 100 is compatible with other write head 10 structures.

In certain embodiments, the method 100 comprises positioning the magnetic write head 10 in a location spaced from the magnetic medium 30 by the flying-height distance D in an operational block 110. In certain embodiments, the write head 10 comprises a magnetic yoke 60 and a proximal region in proximity to the magnetic medium 30. In certain embodiments, the proximal region comprises the gap region 20. The write head 10 of certain embodiments further comprises a resistive heater 50. At least a portion of the resistive heater 50 is within the magnetic yoke 60 and is in proximity to the proximal region. The resistive heater 50 is configured to heat the proximal region, which has a coefficient of thermal expansion. The proximal region is configured to expand and to contract in response to temperature changes of the proximal region. In certain embodiments, the proximal region has a coefficient of thermal expansion of approximately 0.4%/degree Celsius.

In certain embodiments, the method 100 further comprises flowing an electric current through the resistive heater 50. As described above, the resistive heater 50 generates heat in response to the electric current flowing therethrough. In certain embodiments, the method 100 further comprises controlling the electric current to adjust the temperature of the proximal region in an operational block 130. The proximal region selectively expands and contracts in response to temperature variations, thereby controlling the flying-height distance D.

Controlling the electric current in the operational block 130 of certain embodiments comprises adjusting the flying-height distance D to maintain a substantially constant flying-height distance D. Controlling the electric current of certain other embodiments comprises adjusting the flying-height distance to be substantially equal to a predetermined distance. In certain such embodiments, the predetermined distance can be advantageously modified during operation of the write head 10.

In certain embodiments, the electric current is pulsed. In such embodiments, controlling the electric current in the operational block 130 comprises adjusting a pulse width and/or a time interval between pulses. In certain such embodiments, the pulse widths are in a range between zero and approximately one millisecond. In other embodiments, controlling the electric current in the operational block 130 comprises adjusting a magnitude of the electric current. In other embodiments, the duty cycles of the pulses are varied to control the electric current.

In certain embodiments, the electric current is controlled in the operational block 130 by adjusting the temperature of the proximal region to be substantially constant. In certain such embodiments, the write head 10 comprises a temperature sensor. The temperature sensor is configured to generate a signal indicative of the temperature of the proximal region. In such embodiments, the electric current can be controlled in response to the signal from the temperature sensor. The temperature sensor of certain embodiments is in proximity to the proximal region.

Exemplary temperature sensors in accordance with embodiments described herein include, but are not limited to, thermocouples and thermistors. In certain embodiments, the resistance of the resistive coil 50 is temperature-dependent and the resistance of the resistive coil 50 can be used to provide a measure of the temperature of the proximal region. For example, Table 1 provides the thermal coefficients of resistance at 20 degrees Celsius for various materials which can be used in the resistive coil 50.

TABLE 1

| Material | Thermal Coefficient of Resistance (at 20 degrees Celsius) |
|---|---|
| Nickel | 0.005866 |
| Iron | 0.005671 |
| Molybdenum | 0.004579 |
| Tungsten | 0.004403 |
| Aluminum | 0.004308 |
| Copper | 0.004041 |
| Silver | 0.003819 |
| Platinum | 0.003729 |
| Gold | 0.003715 |
| Zinc | 0.003847 |
| Steel (99.5% iron + 0.5% carbon) alloy | 0.003 |
| Nichrome alloy | 0.00017 |
| Nichrome V alloy | 0.00013 |
| Manganin alloy | ±0.000015 |
| Constantan alloy | −0.000074 |

Figure 7:
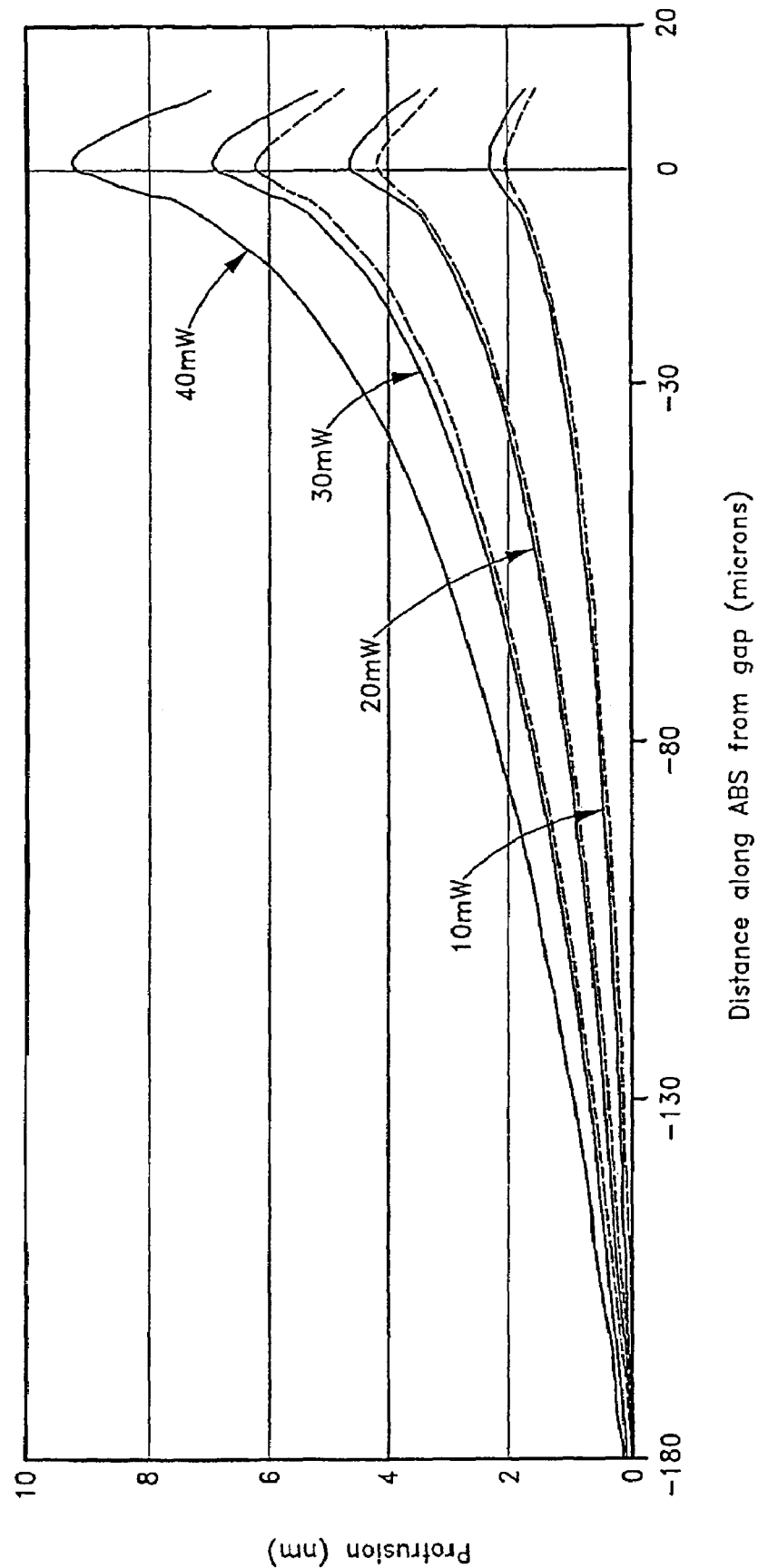
FIG. 7 is a graph of model calculations of the protrusion of the gap region at various points along the air-bearing surface (ABS) as a function of the resistive heating power of the resistive heater.

FIG. 7 is a graph of model calculations of the protrusion of the gap region 20 at various points along the air-bearing surface (ABS) as a function of the resistive heating power of the resistive heater 50 schematically illustrated by FIGS. 1 and 4A. The zero point on the x-axis of FIG. 7 corresponds to the gap between the first pole 62 and the second pole 64 at the ABS. The results of FIG. 7 were calculated by disconnecting two coil turns from the write coil 80 of the write head 10 and using the two coils as the resistive heater 50. The solid lines correspond to configurations in which the two coil turns closest to the ABS are used for the resistive heater 50 ("first coil configuration"), and the dashed lines correspond to configurations in which the two coil turns farthest from the ABS are used for the resistive heater 50 ("last coil configuration").

As shown by FIG. 7, the protrusion increases generally linearly with increasing resistive heating power, with the maximum protrusion occurring at the first pole 62. In addition, the first coil configuration produces larger protrusions than the protrusions produced by the last coil configuration. The first coil configuration has a protrusion which generally linearly increases with increasing resistive heating power with a slope of approximately 0.23 nanometers/milliwatt. The last coil configuration has a protrusion which generally linearly increases with increasing resistive heating power with a slope of approximately 0.206 nanometers/milliwatt. However, the first coil configuration results in higher temperatures at the read head of the read/write head than does the last coil configuration. For the first coil configuration, the temperature of the read head rises generally linearly by approximately 0.8 degrees/milliwatt (corresponding to approximately 3.5 degrees/nanometer of protrusion). For the last coil configuration, the temperature of the read head rises generally linearly by approximately 0.6 degrees/milliwatt (corresponding to approximately 2.9 degrees/nanometer of protrusion). The choice of the first coil configuration, the last coil configuration, or alternative coil configurations may depend, for example, on the temperature tolerance of the read head, the amount of protrusion control desired, or other criteria.

What is claimed is:

1. A magnetic write head comprising:
    a magnetic yoke comprising a first pole and a second pole, the first pole and the second pole each terminating at an air bearing surface, the first pole magnetically coupled to the second pole in a backgap region;
    an electrically conductive write coil magnetically coupled to the magnetic yoke; and
    a resistive heater coil comprising a first coil turn and a second coil turn, the heater coil electrically isolated from the write coil, wherein at least a portion of the first coil turn is between the first pole and the second pole and between the air bearing surface and the backgap region, and at least a portion of the second coil turn is between the first pole and the second pole and between the air bearing surface and the backgap region, wherein the portion of the first coil turn overlaps the portion of the second coil turn, wherein the first coil turn substantially encircles a portion of the magnetic yoke and the second coil turn substantially encircles a portion of the magnetic yoke.

2. The magnetic write head of claim 1, wherein the first coil turn substantially encircles a portion of the backgap region and the second coil turn substantially encircles a portion of the backgap region.

3. The magnetic write head of claim 1, wherein the first coil turn substantially encircles a portion of the first pole and the second coil turn substantially encircles a portion of the first pole.

4. A magnetic write head comprising:
    a magnetic yoke comprising a first pole and a second pole, the first pole and the second pole each terminating at an air bearing surface, the first pole magnetically coupled to the second pole in a backgap region;
    an electrically conductive write coil magnetically coupled to the magnetic yoke; and
    a resistive heater coil comprising a first coil turn having at least one bend to define a first plane, and a second coil turn having at least one bend to define a second plane, the heater coil electrically isolated from the write coil, wherein at least a portion of the first coil turn is between the first pole and the second pole and between the air bearing surface and the backgap region, and at least a portion of the second coil turn is between the first pole and the second pole and between the air bearing surface and the backgap region, wherein the first plane and the second plane are non-coplanar and wherein the first coil turn substantially encircles a portion of the magnetic yoke and the second coil turn substantially encircles a portion of the magnetic yoke.

5. The magnetic write head of claim 4, wherein the first coil turn and the second coil turn have the same shape.

6. The magnetic write head of claim 4, wherein the first coil turn substantially encircles a portion of the backgap region and the second coil turn substantially encircles a portion of the backgap region.

7. The magnetic write head of claim 4, wherein the first coil turn substantially encircles a portion of the first pole and the second coil turn substantially encircles a portion of the first pole.

8. The magnetic write head of claim 4, wherein the first plane and the second plane are substantially parallel.

9. The magnetic write head of claim 4, wherein the first plane is spaced from the second plane in a direction substantially perpendicular to the first plane.

10. The magnetic write head of claim 4, wherein the resistive heater coil comprises an even number of coil turns.

* * * * *